June 12, 1956  G. V. FRUSHOUR  2,750,235
ARTICULATED DEFLECTOR FOR BLOWER
Filed Jan. 18, 1955  2 Sheets-Sheet 1

Inventor
George V. Frushour
by Kenneth Pluckwell
Attorney

June 12, 1956 — G. V. FRUSHOUR — 2,750,235
ARTICULATED DEFLECTOR FOR BLOWER
Filed Jan. 18, 1955 — 2 Sheets-Sheet 2

Inventor
George V. Frushour
by Kenneth [illegible]
Attorney

2,750,235
ARTICULATED DEFLECTOR FOR BLOWER

George V. Frushour, Anniston, Ala., assignor to Allis-Chalmers Manufacturing Company, Milwaukee, Wis.

Application January 18, 1955, Serial No. 482,510

9 Claims. (Cl. 302—61)

This invention relates generally to pneumatic conveyor systems and it is concerned more particularly with a deflector device or distributor for use with a material blower pipe.

In the handling of blown material it is desirable to provide the discharge end of the pipe with a device for directing the ejected material in a desired direction.

It is therefore an object of this invention to provide a deflector device which is rotatable in any increment up to 360° for adjustment about the material movement axis of a blower pipe connected thereto.

It is a further object of this invention to provide an articulated deflector device which may be angled in any increment up to 90° for directing material out of its normal path of travel.

It is a further object of this invention to provide a rotatably adjustable articulated deflector of the hereinabove outlined character which can be controlled from a remote point to effect the rotary adjustment as well as the adjustment of the deflecting angle.

It is a further object of this invention to provide a blower discharge pipe section with a material deflector made of articulated sections of conduit and means for simultaneously and uniformly angling all the articulated sections about their respective pivot axes.

It is a further object of this invention to provide a material deflector having a range of adjustment for deflecting material up to 90° out of course without providing obstructions for the material being handled.

It is a further object of this invention to provide a material deflector of articulated sections of conduit which are adjustable to various positions and wherein for all positions of the articulated sections, the base portions thereof are tangential to a smooth curve forming a path for the deflected material to follow.

These and other important objects will become apparent from the disclosures in the following detailed description and accompanying drawings, in which.

Figure 1:
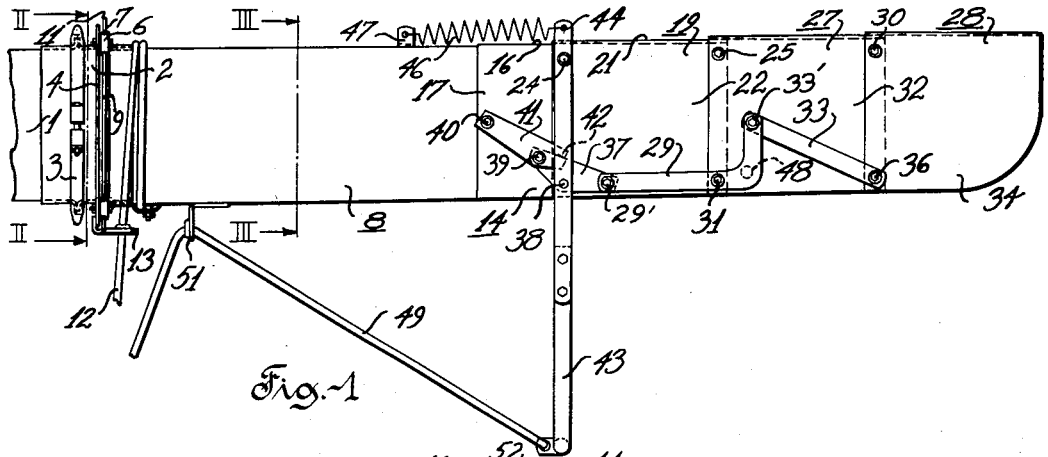
Fig. 1 is a side elevation of the discharge end of a material blowing pipe including a deflecting mechanism embodying the invention.
Figure 6:
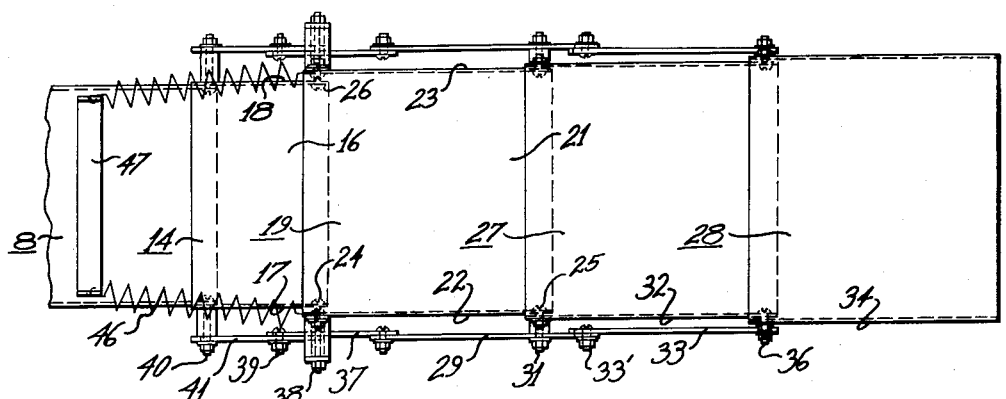
Fig. 6 is an enlarged plan view of the deflecting mechanism shown in Fig. 1.
Figure 2:
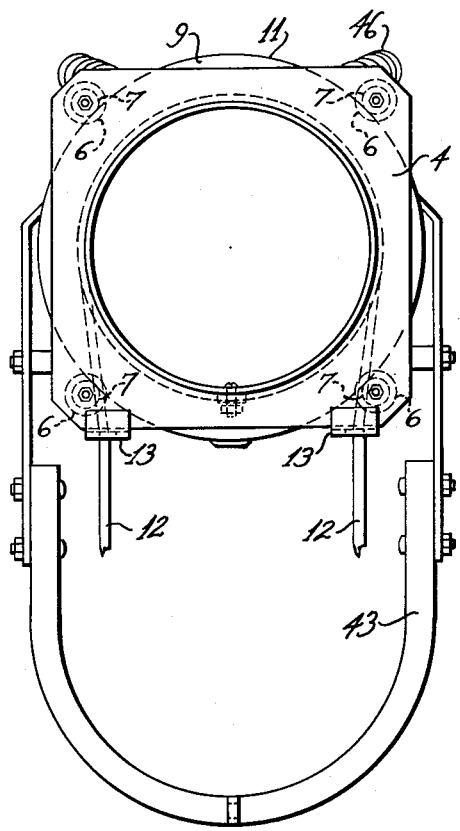
Fig. 2 is a section view taken on line II—II of Fig. 1.

Referring to Fig. 1, it is seen that a longitudinally extending material blower pipe 1 is provided with a material deflecting device including a pipe section 2 fixed to pipe 1 by means of a coupling band 3. A transversely extending generally square plate 4 (Figs. 1 and 2) is attached to the outer periphery of section 2, and four rollers 6 are rotatably supported, respectively, at the corners of plate 4. Each of these rollers 6 is provided with a peripheral groove 7 (Fig. 1). A round to square conversion pipe section 8 (Figs. 1 and 6) has its round end positioned closely adjacent and in alignment with the discharge end of pipe section 2. A radially outward extending annular flange 9 is attached about the outer surface of the material receiving end of section 8 and is constructed and arranged so as to have its outer peripheral edge 11 (Fig. 2) received within grooves 7 for rotative movement about the longitudinal material movement axis of blower pipe 1. A flexible line 12 is attached at a midportion thereof to section 8 and is wound thereabout and extends through guides 13 carried by plate 4 to a remote point (not shown) thereby permitting conversion section 8 and members attached thereto to be rotated relative to fixed section 2 and pipe section 1 from a remote point by a pull on either end of line 12.

A trough section 14 of inverted U-shaped configuration (Figs. 1 and 6) is rigidly attached in telescoping or overlapping relation to the square end of section 8 and includes a plane base wall portion 16 which forms the bottom of trough 14, and plane side wall portions 17 and 18 which extend at right angles to the base wall portion 16.

Figure 3:
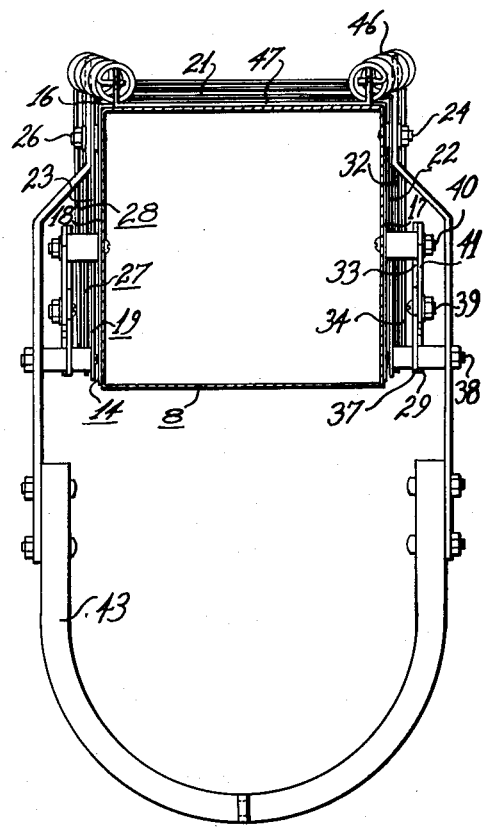
Fig. 3 is a section view taken on line III—III of Fig. 1.

A first conduit section 19 of inverted U-shaped cross sectional configuration is pivotally attached in telescoping or overlapping relation to section 14. Section 19 includes a plane base wall portion 21 and plane parallel side walls 22 and 23 extending at right angles to the base wall portion 21. Section 19 is pivoted to section 14 by means of bolt 24 which extends through sides 17 and 22, and by means of bolt 26 (Figs. 3 and 6) which extends through sides 18 and 23. Bolts 24 and 26 are provided with suitable fastening members such as nuts. It should be noted that bolts 24 and 26 are aligned on a transverse axis which is positioned adjacent to base wall portions 16 and 21. A second conduit section 27 of inverted U-shaped configuration is telescopically received about and pivotally connected to the first conduit section 19 in a manner similar to the connection between inverted trough section 14 and conduit section 19, the pivot axis of conduit section 27 on conduit section 19 being indicated at 25 in Fig. 1. And yet another conduit section 28 is pivotally attached to conduit section 27 at 30 (Fig. 1) in a similar manner to section 27.

A lever 29 having two arms at right angles to each other is pivotally mounted on a pivot bolt 31 carried by side wall 32 of section 27 adjacent the lower edge thereof. A link 33 is pivotally attached at one end to a lower edge of side wall 34 of section 28 by means of a pivot bolt 36. The other end of link 33 is pivotally connected to one arm of lever 29 at a point 33' in upwardly and horizontally spaced relation to the pivot bolt 31.

A generally triangular plate 37 is pivotally connected at a midcorner portion thereof to side wall 22 by means of a pivot bolt 38. An end corner portion of plate 37 is pivotally connected to the arm of lever 29 which extends along the trough section 19; and the other end corner portion of triangular plate 37 is pivotally connected to a pivot bolt 39 carried by a plate 41 pivotally attached to side wall 17 of fixed trough section 14 by pivot bolt 40. Lock member or plate 41 is provided with a turned over lug portion 42 which coacts with plate 37 to limit the pivotal movement thereof and the movement of sections 19, 27 and 28 in one direction as is indicated in Fig. 1. A control element or operating member in the form of a bail 43 is attached to section 19 by means of bolt 24 and bolt 38 for movement therewith. The upper end of bail 43 is provided with an opening 44 to which one end of a spring 46 is attached. The other end of spring 46 is attached to a bracket 47 carried by conversion section 8. In the previous description only one side of the deflecting device has been described in detail, and it will be apparent from looking at Figs. 2, 3 and 6 that most of the structure described is actually duplicated on the other side of the device. Accordingly, the foregoing description of parts at one side of the device analogously applies to corresponding parts at the other side of the device.

Figure 5:
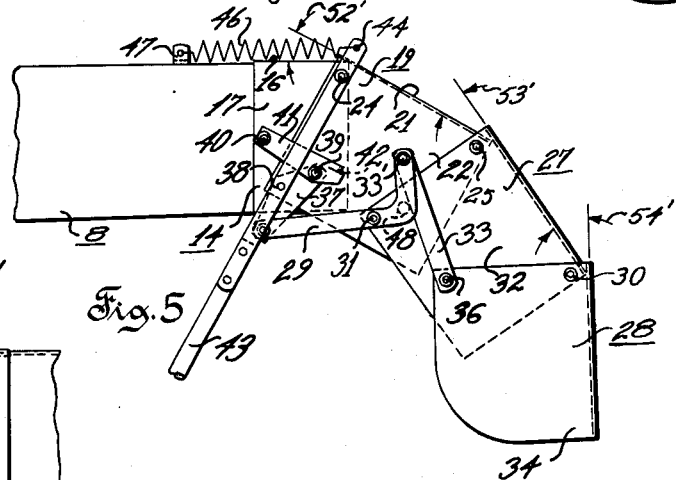
Fig. 5 is a side elevation similar to Fig. 1 with the deflecting mechanism adjusted to a 90° angle.
Figure 7:
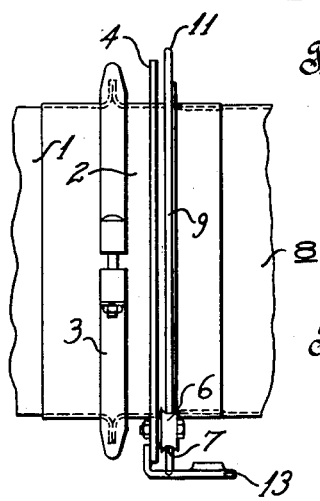
Fig. 7 is an enlarged portion of the device shown in Fig. 1 with some parts removed for clarity of illustration.

It is to be noted that lever 29 is provided at its apex with a stop member in the form of a stud 48 which coacts with link 33 for limiting the movement of the link 33 and sections 19, 27 and 28 in one direction as is shown in Fig. 5.

A flexible line 49 (Fig. 1) is attached to the lower end of bail 43 and passes through a guide member 51 carried by pipe section 8. The length of line 49 is sufficient to extend to a remote point so that control element 43 can be remotely activated from the same position line 12 is manipulated from.

If desired, section 14 can be omitted and the articulated deflecting sections can be connected directly to conversion pipe section 8 as section 14 is in effect only a rigid extension thereof.

From the foregoing, it is seen that a deflecting device has been provided which is capable of being rotated about the longitudinal axis of pipe 1 a full 360° and this rotation is accomplished by a pull on either end of line 12. In addition, a pull on line 49 will uniformly angle articulated sections 19, 27 and 28 to any desired degree up to a sum total of 90° in a transverse deflecting direction. When the desired degree of angularity is obtained by a pull on line 49, the line is then fastened down as springs 46 tend to return the articulated sections into the position shown in Fig. 1.

When the deflecting device is adjusted in any position between those shown in Figs. 1 and 5 the angles formed between the articulated sections and their adjoining section of pivotal connection are equal. For example, see Fig. 4 in which angles 52, 53 and 54 are all equal, and Fig. 5 in which angles 52′, 53′ and 54′ are all equal. From the foregoing, it is seen that an articulated material deflector has been provided which is rotatably adjustable in any increment up to 360° about the material movement axis of a blower pipe connected thereto and wherein the deflector may be adjusted to deflect material in any increment up to 90° out of its normal path of material movement and wherein such adjustments can be made at a remote point.

Figure 4:
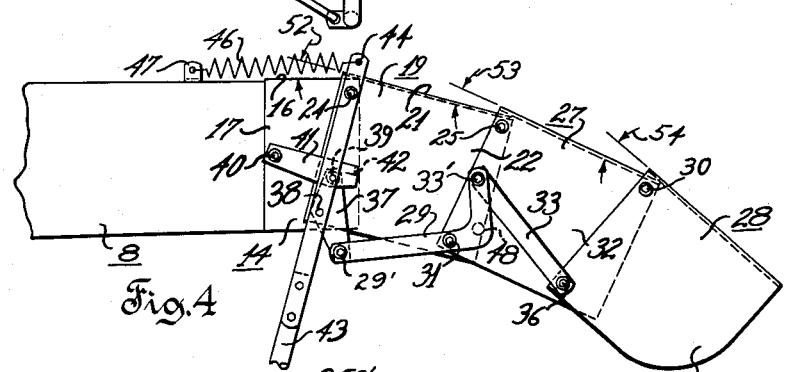
Fig. 4 is a side elevation similar to Fig. 1 with the deflecting mechanism adjusted to a 45° angle.

It is to be further noted, as shown in Figs. 4 and 5, that the articulated members of the deflecting device approximate and are tangential to smooth curves in any adjusted positions and provide no projections on which material being blown can collect on.

In general terms, the herein disclosed material deflecting device comprises a first, a second, and a third conduit section as represented by conduit sections 19, 27 and 28, respectively, each of these sections having a deflecting wall and a pair of relatively opposed side walls, the deflecting wall of the first section 19 being designated by the reference character 21 and the side walls by the reference characters 22 and 23. The bolts 24, 26 and associated parts represent first joint means which hingedly connect the first conduit section 19 with the pipe member 8, and second and third joint means which hingedly connect the second conduit section 27 with the first conduit section 19, and a third conduit section 28 with the second conduit section 27, are indicated at 25 and 30, respectively. The triangular plate 37 represents a double armed rocker which is pivotally mounted at one side of the device on the first conduit section 19 for swinging movement on an axis extending in parallel and radially spaced relation to the hinge axis of the first joint means at 24 and 26. The plate 41 represents a control link which has a fixed pivot center at 40 on the pipe member 8 and which is pivotally connected at a predetermined distance from said fixed pivot center with one arm of the rocker 37 as indicated at 39. The double armed lever 29 is pivotally mounted at said one side of the device on the second conduit section 27 for swinging movement on bolt 31, that is, on an axis which extends in parallel and radially spaced relation to the hinge axis of the second joint means 25. A pivot pin 29′ (Fig. 1) at the end of the rearwardly extending arm of lever 29 represents pivot means hingedly connecting one arm of the lever 29 with the other arm of the rocker 37. The link 33 represents a floating link which is pivotally mounted at said one side of the device on the third conduit section 28 for swinging movement on an axis which is afforded by pivot bolt 36 and extends in parallel and radially spaced relation to the hinge axis of the third joint means 30. The floating link 33 has a pivot connection at 33′ with the other arm of the lever 29. Stop means including the lug portion 42 and an edge portion of rocker 37 are operatively associated with the control link 41 and with the first conduit section 19, respectively, so as to move into and out of cooperative engagement with each other by pivotal movement of the first conduit section 19 in one direction and the other, respectively, about the hinge axis of the first joint means 24, 26. Similarly, other stop means including the stud 48 and an edge portion of floating link 33 are associated, respectively, with the second conduit section 27 and with the floating link 33 so as to move into and out of cooperative engagement with each other by pivotal movement of the first conduit section 19 in one direction and the other, respectively, about the hinge axis of the first joint means 24, 26.

It is apparent that herein is provided a novel material deflecting device, and the intention is to limit the invention only within the scope of the appended claims.

It is claimed and desired to secure by Letters Patent:

1. A material deflecting device adapted to be connected to a material blower discharge pipe and comprising a round to square conversion pipe section being provided at the round end thereof with a radially outward extending annular flange, said flange being adapted to be rotatably received between rollers carried on said discharge pipe, means for rotating said conversion pipe section relative to said discharge pipe from a remote point, a first generally trough shaped conduit section having one end telescopically mounted about the square end of said conversion pipe section, said first conduit section being pivotally attached adjacent its base wall portion to said conversion pipe section; a second generally trough shaped conduit section telescopically mounted about the discharge end of said first conduit section, said second conduit section being pivotally attached adjacent its base wall portion to said first conduit section adjacent said base wall portion of the latter, a third trough shaped conduit section telescopically mounted about the discharge end of said second conduit section, said third conduit section being pivotally attached adjacent its base wall portion to said second conduit section adjacent said base wall portion of the latter, an operating member attached to said first conduit section for pivotal movement therewith relative to said conversion pipe section, a double armed lever mounted on said second conduit section for pivotal movement relative thereto, a link pivotally connecting one end of said lever and said third conduit section, a plate pivotally mounted on said operating member and having one end thereof pivotally attached to the other end of said lever, a lock member attached to said conversion section and providing a pivotal connection with the other end of said plate, whereby a pull on said operating member causes said first, second and third conduit sections to pivot about their respective pivotal connections to provide a curved articulated trough extension of the blower discharge pipe, said lock member coacting with said plate for limiting the pivotal movement of said device.

2. A material deflecting device positionable in a plurality of material deflecting positions relative to a longitudinally extending material blower discharge pipe, said device comprising a conversion pipe section including a square end portion and an opposite round end portion adapted to be rotatably connected to the material discharge end of said blower pipe, a first conduit section of U-shaped cross sectional configuration having one end telescopically and pivotally received about said square end portion for pivotal movement about a first axis extending transversely to the direction of material movement, said first axis being positioned adjacent the base wall of said first conduit section, a second conduit section of U-shaped cross sectional configuration having one end telescopically and pivotally received about the other end of said first conduit section for pivotal movement about a second transverse axis extending parallel to said first axis, said second axis being positioned adjacent the base wall of said second conduit section, a third conduit section of U-shaped cross sectional configuration having one end telescopically and pivotally received about the other end of said second conduit section for pivotal movement about a third transverse axis extending parallel to said second axis, said third axis being positioned adjacent the base wall of said third conduit section, actuating means for uniformly and simultaneously angling said first, second and third conduit sections, said actuating means including a control element attached to said first conduit section for movement therewith, a double armed lever mounted on said second conduit section for pivotal movement relative thereto, a link pivotally connecting one end of said lever and said third conduit section, a plate pivotally mounted on said control element and having one end thereof pivotally attached to the other end of said lever, a lock member pivotally connected to said conversion pipe section and providing a pivotal connection with the other end of said plate, whereby a movement of said control element causes said first, second and third conduit sections to pivot uniformly about said first, second and third axes to provide a curved articulated trough extension of the blower pipe, said lock member coacting with said plate for limiting movement of said three sections in one direction when said sections are in axial alignment with said discharge pipe, means biasing said conduit sections toward coaxial relation to said discharge pipe, and remote control means for adjusting said device and for retaining it in a desired position.

3. A material deflecting device positionable in a plurality of material deflecting positions relative to a longitudinally extending material blower discharge pipe, said device comprising a conversion pipe section including a square end portion and an opposite round end portion adapted to be rotatably connected to the material discharge end of said blower pipe in extension forming relation thereto, remote control means for controlling the position of said conversion section about the longitudinal axis of said blower discharge pipe, a first conduit section of U-shaped cross sectional configuration having one end telescopically and pivotally received about said square end portion for pivotal movement about a first axis extending transversely to the direction of material movement, said first axis being positioned adjacent the base wall of said first conduit section, a second conduit section of U-shaped cross sectional configuration having one end telescopically and pivotally received about the other end of said first conduit section for pivotal movement about a second transverse axis extending parallel to said first axis, said second axis being positioned adjacent the base wall of said second conduit section, a third conduit section of U-shaped cross sectional configuration having one end telescopically and pivotally received about the other end of said second conduit section for pivotal movement about a third transverse axis extending parallel to said second axis, said third axis being positioned adjacent the base wall of said third conduit section, actuating means for uniformly and simultaneously angling said first, second and third conduit sections, said actuating means including a control element attached to said first conduit section for movement therewith, a double armed lever mounted on said second conduit section for pivotal movement relative thereto, a link pivotally connecting one end of said lever and said third conduit section, a plate pivotally mounted on said control element and having one end thereof pivotally attached to the other end of said lever, a lock member attached to said conversion pipe section and providing a pivotal connection with the other end of said plate, whereby a movement of said control element causes said first, second and third conduit sections to pivot uniformly about said first, second and third axes to provide a uniformly curved articulated trough extension of the blower pipe, said lock member coacting with said plate for limiting movement of said three conduit sections in one direction when said sections are in axial alignment with said discharge pipe, means biasing said conduit sections toward coaxial relation to said discharge pipe, and remote control means for adjusting said device to and for retaining it in a desired position.

4. A material deflecting device positionable in a plurality of material deflecting positions relative to a longitudinally extending material blower discharge pipe, said device comprising a conversion pipe section including a square end portion and an opposite round end portion adapted to be rotatably connected to the material discharge end of said blower pipe, a first conduit section of U-shaped cross sectional configuration having one end telescopically and pivotally received about said square end portion for pivotal movement about a first axis extending transversely to the direction of material movement, said first axis being positioned adjacent the base wall of said first conduit section, a second conduit section of U-shaped cross sectional configuration having one end telescopically and pivotally received about the other end of said first conduit section for pivotal movement about a second transverse axis extending parallel to said first axis, said second axis being positioned adjacent the base wall of said second conduit section, a third conduit section of U-shaped cross sectional configuration having one end telescopically and pivotally received about the other end of said second conduit section for pivotal movement about a third transverse axis extending parallel to said second axis, said third axis being positioned adjacent the base wall of said third conduit section, actuating means for uniformly and simultaneously angling said first, second and third conduit sections, said actuating means including a control element attached to said first conduit section for movement therewith, a double armed lever mounted on said second conduit section for pivotal movement relative thereto, a link pivotally connecting one end of said lever and said third conduit section, a plate pivotally mounted on said control element and having one end thereof pivotally attached to the other end of said lever, a lock member attached to said conversion pipe section and providing a pivotal connection with the other end of said plate, whereby a movement of said control element causes said first, second and third conduit sections to pivot uniformly about said first, second and third axes to provide a curved articulated trough extension of the blower pipe, said lock member coacting with said plate for limiting movement of said three sections in one direction when said sections are in axial alignment with said discharge pipe, means biasing said conduit sections toward coaxial relation to said discharge pipe, remote control means for adjusting said device to and for retaining it in a desired position, and stop means carried by said lever and coacting with said link for limiting movement of said sections in an opposite direction.

5. In combination, a pipe member and an articulated material deflecting device operatively connected in material receiving relation with said pipe member at one end of the latter, said material deflecting device comprising a first, a second and a third conduit section each having an inlet portion and an outlet portion opposite to said inlet portion, first and second joint means hingedly connecting said first conduit section at its inlet and outlet portions, respectively, with said pipe member and with said inlet portion of said second conduit section, third joint means hingedly connecting said second conduit section at its outlet portion with the inlet portion of said third conduit section, a double armed rocker pivotally mounted on said first conduit section in radially spaced relation to the hinge axis of said first joint means, a control link having a fixed pivot center on said pipe member and being pivotally connected at a predetermined distance from said fixed pivot center with one arm of said rocker, a double armed lever having a fixed pivot center on said second conduit section in radially spaced relation to the hinge axis of said second joint means, pivot means hingedly connecting one arm of said lever with the other arm of said rocker, a floating link pivotally connected with said third conduit section in radially spaced relation to the hinge axis of said third joint means, and a pivot connection between said floating link and the other arm of said lever.

6. The combination recited in claim 5, and stop means operatively associated with said control link and with said first conduit section, respectively, so as to move into and out of cooperative engagement with each other by pivotal movement of said first conduit section in one direction and the other, respectively, about the hinge axis of said first joint means.

7. The combination recited in claim 5, and stop means operatively associated with said second conduit section and with said floating link, respectively, so as to move into and out of cooperative engagement with each other by pivotal movement of said first conduit section in one direction and the other, respectively, about the hinge axis of said first joint means.

8. The combination recited in claim 5, and further comprising stop means operatively associated, respectively, with said control link and with said first conduit section so as to move into and out of cooperative engagement with each other by pivotal movement of said first conduit section in one direction and the other, respectively, about the hinge axis of said first joint means, and other stop means operatively associated, respectively, with said double armed lever and with said floating link, so as to move out of and into cooperative engagement with each other by said pivotal movement of said first conduit section in said one and in said other direction, respectively.

9. In combination, a pipe member and an articulated material deflecting device operatively connected in material receiving relation with said pipe member at one end of the latter, said material deflecting device comprising a first, a second and a third conduit section each having a deflecting wall and a pair of relatively opposed side walls connected with said deflecting wall, first and second joint means hingedly connecting said first conduit section with said pipe member and with said second conduit section, respectively, on axes extending transversely of said pipe member and parallel to the deflecting walls of said first and second conduit sections, third joint means hingedly connecting said second conduit section with said third conduit section on an axis extending parallel to the deflecting walls of said second and third conduit sections, a double armed rocker pivotally mounted at one side of said device on said first conduit section for swinging movement on an axis extending in parallel and radially spaced relation to the hinge axis of said first joint means, a control link having a fixed pivot center on said pipe member and being pivotally connected at a predetermined distance from said fixed pivot center with one arm of said rocker, a double armed lever pivotally mounted at said one side of said device on said second conduit section for swinging movement on an axis extending in parallel and radially spaced relation to the hinge axis of said second joint means, pivot means hingedly connecting one arm of said lever with the other arm of said rocker, a floating link pivotally mounted at said one side of said device on said third conduit section for swinging movement on an axis extending in parallel and radially spaced relation to the hinge axis of said third joint means, and a pivot connection between said floating link and the other arm of said lever.

References Cited in the file of this patent

UNITED STATES PATENTS

| | | |
|---|---|---|
| 595,390 | Heggem | Dec. 14, 1897 |
| 725,624 | Leonard | Apr. 14, 1903 |
| 1,487,634 | Waters | Mar. 18, 1824 |
| 1,934,939 | Manierre | Nov. 14, 1933 |
| 2,171,952 | Ruskamp | Sept. 5, 1939 |